United States Patent
Lee et al.

(10) Patent No.: US 9,240,582 B2
(45) Date of Patent: Jan. 19, 2016

(54) BATTERY PACK

(71) Applicant: Samsung SDI Co., Ltd., Yongin, Gyeonggi-do (KR)

(72) Inventors: Seong-Joon Lee, Yongin (KR); Woo-Jin Lee, Yongin (KR)

(73) Assignee: Samsung SDI Co., Ltd., Yongin-si (KR)

( * ) Notice: Subject to any disclaimer, the term of this patent is extended or adjusted under 35 U.S.C. 154(b) by 371 days.

(21) Appl. No.: 13/836,600

(22) Filed: Mar. 15, 2013

(65) Prior Publication Data

US 2014/0072832 A1 Mar. 13, 2014

(30) Foreign Application Priority Data

Sep. 13, 2012 (KR) .......................... 10-2012-0101480

(51) Int. Cl.
| | |
|---|---|
| H01M 10/46 | (2006.01) |
| H01M 2/34 | (2006.01) |
| H01M 2/06 | (2006.01) |
| H01M 2/08 | (2006.01) |
| H01M 10/42 | (2006.01) |
| H01M 2/02 | (2006.01) |

(52) U.S. Cl.
CPC ............ *H01M 2/34* (2013.01); *H01M 2/06* (2013.01); *H01M 2/08* (2013.01); *H01M 10/4257* (2013.01); *H01M 2/0217* (2013.01)

(58) Field of Classification Search
CPC .. H01M 2/08; H01M 2200/00; H01M 10/052
See application file for complete search history.

(56) References Cited

U.S. PATENT DOCUMENTS

| | | | |
|---|---|---|---|
| 2005/0084749 A1* | 4/2005 | Hwang et al. | ................. 429/127 |
| 2006/0266542 A1 | 11/2006 | Yoon | |
| 2009/0297942 A1 | 12/2009 | Jang et al. | |
| 2009/0325043 A1* | 12/2009 | Yoon et al. | ..................... 429/90 |
| 2011/0039130 A1 | 2/2011 | Baek et al. | |
| 2011/0195281 A1 | 8/2011 | Jang | |

FOREIGN PATENT DOCUMENTS

| | | |
|---|---|---|
| KR | 2006-0113802 A | 11/2006 |
| KR | 2009-0064069 A | 6/2009 |
| KR | 2009-0126092 A | 12/2009 |
| KR | 2011-0093594 A | 8/2011 |

* cited by examiner

*Primary Examiner* — Stewart Fraser
*Assistant Examiner* — Olatunji Godo
(74) *Attorney, Agent, or Firm* — Knobbe Martens Olson & Bear LLP

(57) ABSTRACT

A battery pack includes an electrode assembly, a protective circuit module and a battery case. The electrode assembly is composed of first and second electrode plates, a separator interposed between the first and second electrode plates, and first and second electrode tabs respectively connected to the first and second electrode plates. The protective circuit module is connected to the first and second electrode tabs. The battery case accommodates the electrode assembly and has a sealing portion provided at an edge thereof. In the battery pack, the first and second electrode tabs are extracted to the outside of the battery case through the sealing portion and then bent at an end of the sealing portion so as to face the battery case, and a protective circuit module is provided between the battery case and the first and second electrode tabs.

18 Claims, 5 Drawing Sheets

// BATTERY PACK

RELATED APPLICATIONS

This application claims priority to and the benefit of Korean Patent Application No. 10-2012-0101480, filed on Sep. 13, 2012, in the Korean Intellectual Property Office, the entire content of which is incorporated herein by reference.

BACKGROUND

1. Field

An aspect of the present invention relates to a battery pack, and more particularly, to a battery pack of which weight and size are reduced.

2. Description of the Related Art

Recently, battery packs have been variously used as power sources of portable electronic devices. As the portable electronic devices are used in various fields, demands on battery packs are rapidly increased. The battery packs can be charged/discharged a plurality of times, and accordingly are economically and environmentally efficient. Thus, the use of the battery packs is encouraged.

As a reduction in the size and weight of the electronic devices is required, a reduction in the size and weight of the battery packs is also required. On the other hand, since a material such as lithium having high reactivity is provided in a battery pack, a reduction in the size and weight of the battery pack is limited due to the safety of the battery pack. Accordingly, a variety of studies have been conducted to develop a battery pack which can reduce the size and weight of the battery pack while improving the safety of the battery pack.

SUMMARY

Embodiments provide a battery pack of which size and weight are reduced using a new member.

Embodiments also provide a battery pack having improved safety.

According to an aspect of the present invention, there is provided a battery pack including: an electrode assembly composed of first and second electrode plates, a separator interposed between the first and second electrode plates, and first and second electrode tabs respectively connected to the first and second electrode plates; a protective circuit module connected to the first and second electrode tabs; and a battery case that accommodates the electrode assembly and has a sealing portion provided at an edge thereof, wherein the first and second electrode tabs are extracted to the outside of the battery case through the sealing portion and then bent at an end of the sealing portion so as to face the battery case, and a protective circuit module is provided between the battery case and the first and second electrode tabs.

The battery case may be composed of first and second sub-cases. An accommodating portion that accommodates the electrode assembly may be provided to the first sub-case. The second sub-case may cover the first sub-case.

The first and second electrode tabs may be extracted to the outside of the battery case through the sealing portion and then bent at the end of the sealing portion so as to face the accommodating portion of the first sub-case.

The protective circuit module may be composed of a first surface on which components are mounted and a second surface that is a surface opposite to the first surface. The first and second electrode tabs may be provided on the second surface. The first surface may face the accommodating portion of the first sub-case.

The first and second electrode tabs may be provided with first and second films, respectively. The first and second films may be provided to be mounted on the sealing portion.

The width of each of the first and second films in the extraction direction of the first and second electrode tabs may be provided wider than that of the sealing portion so that the first and second films are extended to the outside of the sealing portion.

At least one of the first and second films may be provided with a bending portion, and the bending portion may be provided to correspond to the portion at which each of the first and second electrode tabs is bent.

Each of the first and second films may be further provided with a cut-away portion, and the cut-away portion may be provided to correspond to the bending portion.

The first and second films may be provided wider than the first and second electrode tabs, respectively. The cut-away portion may be provided so that the first and second electrode tabs are not exposed.

One ends of the first and second electrode tabs may be connected to the protective circuit module, and the first and second films may be provided at portions except the one ends of the first and second electrode tabs, respectively.

The first and second electrode tabs may be vertically bent at the end of the sealing portion of the battery case, and the space between the battery case and the first and second electrodes may be provided to correspond to the protective circuit module.

The first and second electrode plates may include positive and negative electrode plates, respectively. The first and second electrode tabs may include positive and negative electrode tabs, respectively. The battery case may be sequentially composed of an internal resin layer, a metal layer and an external resin layer. The metal layer may be made of the same metal as the first electrode tab.

As described above, according to the present invention, it is possible to provide a battery pack of which size and weight are reduced using a new member.

Further, it is possible to provide a battery pack having improved safety.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
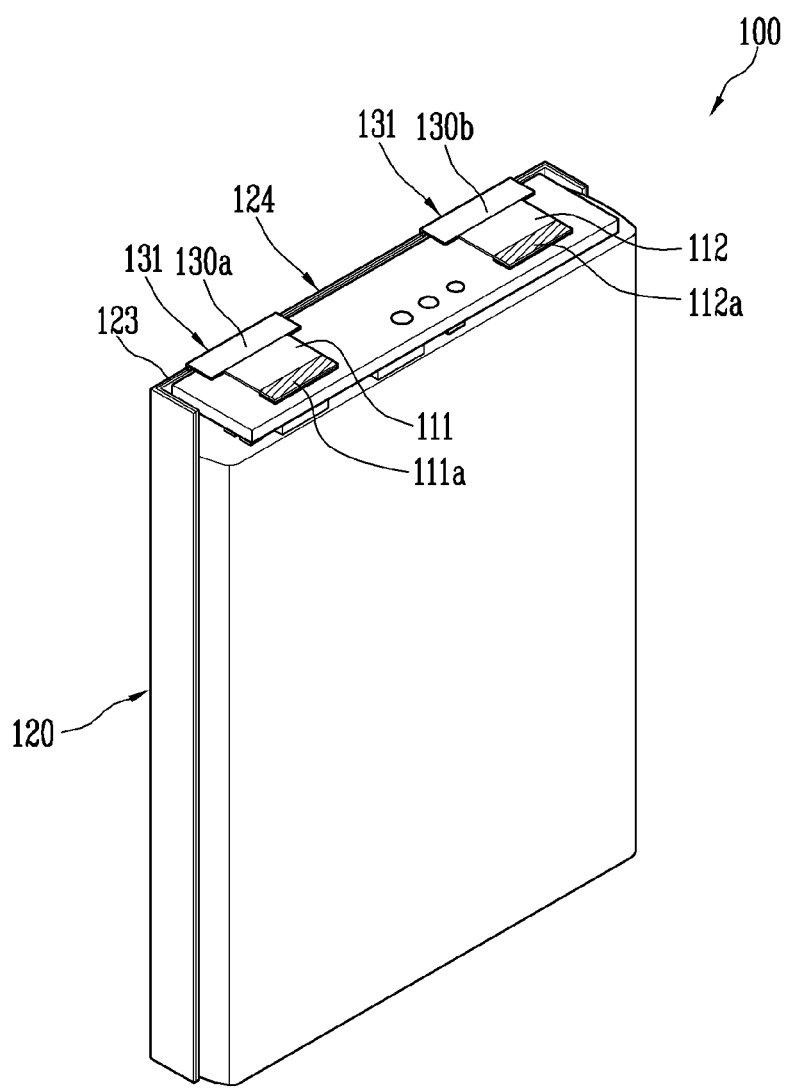
FIG. 1 is a perspective view of a battery pack according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, an exemplary embodiment of the present invention will be described in detail with the accompanying drawings.

Figure 2:
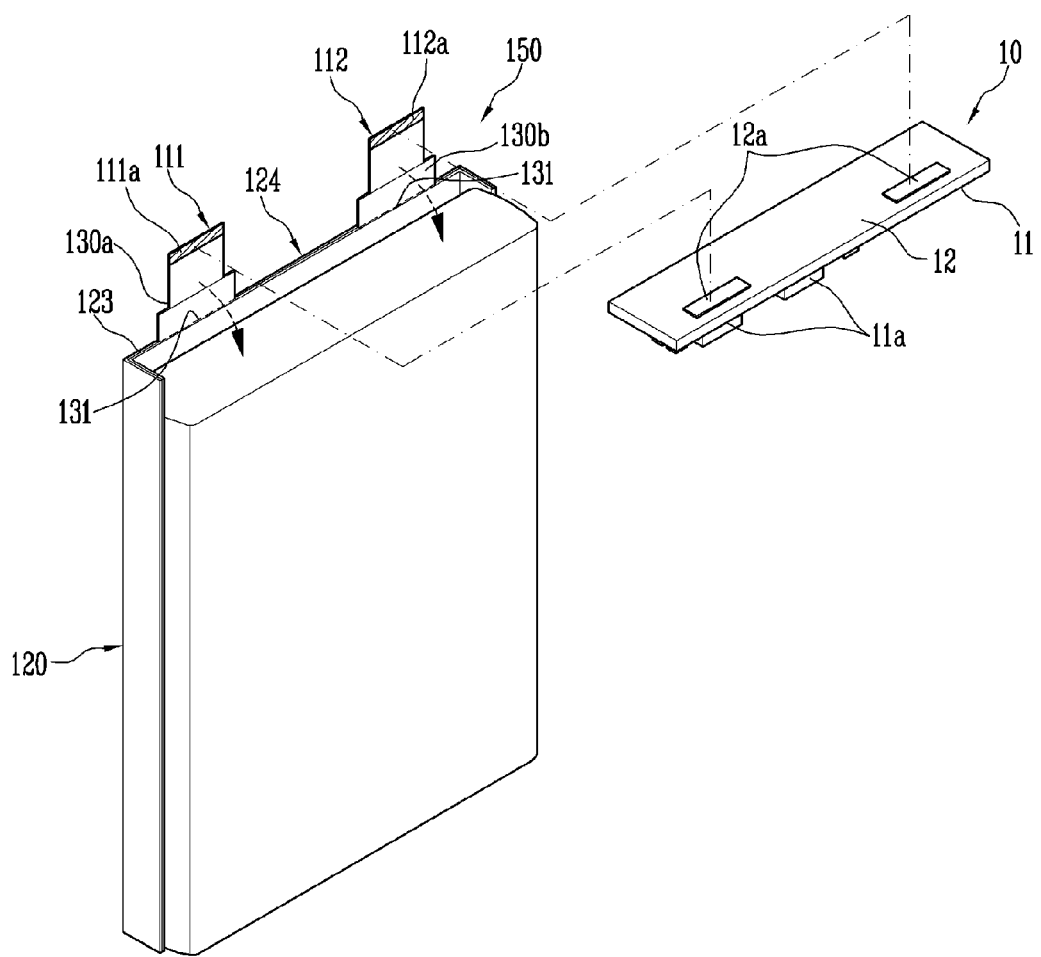
FIG. 2 is an exploded perspective view of the battery pack of FIG. 1.
Figure 3:
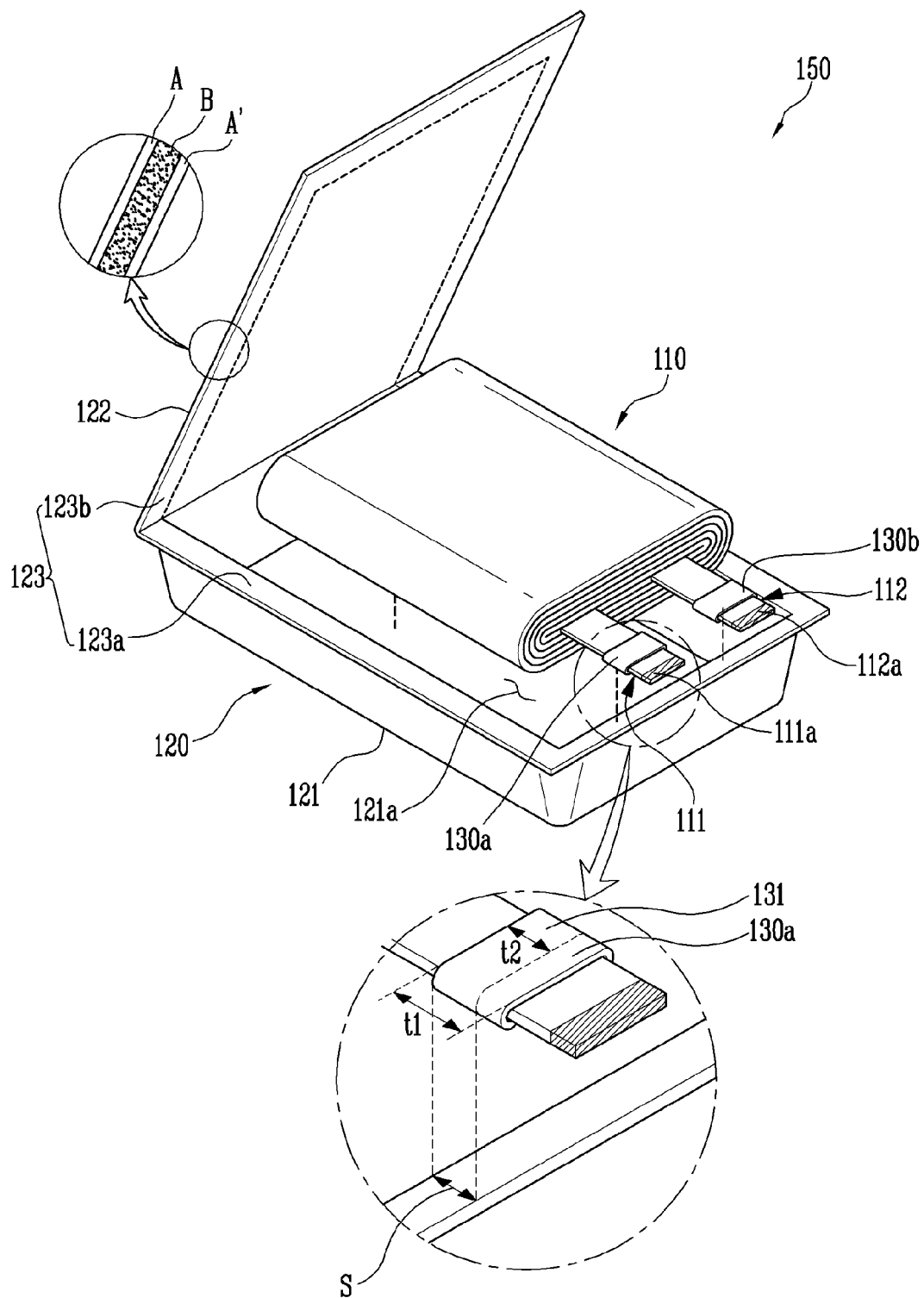
FIG. 3 is an exploded perspective view of a bare cell of FIG. 1.

FIG. 1 is a perspective view of a battery pack according to an embodiment of the present invention. FIG. 2 is an exploded perspective view of the battery pack of FIG. 1. FIG. 3 is an exploded perspective view of a bare cell of FIG. 1.

The battery pack 100 according to this embodiment includes an electrode assembly 110 composed of first and second electrode plates, a separator interposed between the first and second electrode plates, and first and second electrode tabs 111 and 112 respectively connected to the first and second electrode plates; a protective circuit module 10 connected to the first and second tabs 111 and 112; and a battery case 120 that accommodates the electrode assembly 110 and has a sealing portion 123 provided at an edge thereof. The first and second electrode tabs 111 and 112 are extracted to the outside of the battery case 120 through the sealing portion 123 and then bent at an end 124 of the sealing portion 123 so as to face the battery case 120. The protective circuit module 10 may be provided between the battery case 120 and the first and second electrode tabs 111 and 112.

The battery pack 100 may include a bare cell 150 composed of the electrode assembly 110 and the battery case 120, and the protective circuit module 10 electrically connected to the bare cell 150.

The electrode assembly 110 includes the first and second electrode tabs 111 and 112 respectively connected to the first and second electrode plates, and the first and second electrode tabs 111 and 112 may be extracted from the electrode assembly 110 to the outside of the battery case 120. Electrochemical energy is generated by moving ions or electrons between the first and second electrode plates. The electrochemical energy may be transferred to the outside through the first and second electrode tabs 111 and 112. The electrode assembly 110 may be manufactured using various methods including a method of winding or stacking together the first and second electrode plates and the separator.

The battery case 120 is composed of first and second sub-cases 121 and 122. The first sub-case 121 is provided with an accommodating portion 121a that accommodates the electrode assembly 110, and the second sub-case 122 may cover the first sub-case 121. The bare cell 150 may be manufactured by accommodating the electrode assembly 110 and an electrolyte in the accommodating portion 121a of the first sub-case 121 and then thermally fusing edges of the first and second sub-cases 121 and 122 in a state in which the first and second sub-cases 121 and 122 are adhered closely to each other. The accommodating portion 121a may be provided to correspond to the shape of the electrode assembly 110. For example, the accommodating portion 121a may be provided to the first sub-case 121 through deep drawing process of manufacturing a hollow container from a flat plate.

The first and second electrode tabs 111 and 112 may be extracted to the outside of the battery case 120 through the sealing portion 123 and then bent so as to face the battery case 120. In this case, the protective circuit module 10 may be provided between the battery case 120 and the first and second electrode tabs 111 and 112. The first and second electrode tabs 111 and 112 may be bent at the end 124 of the sealing portion 123 so as to face the accommodating portion 121a of the first sub-case 121.

For example, the first and second electrode plates include positive and negative electrode plates, respectively, and the first and second electrode tabs 111 and 112 include positive and negative electrode tabs, respectively. The battery case 120 is sequentially composed of an internal resin layer A', a metal layer B and an external resin layer A, and the metal layer B may be made of the same metal as the first electrode tab 111.

The internal resin layer A', the metal layer B and the external resin layer A may be sequentially laminated. The internal resin layer A' is a portion that directly faces the electrode assembly 110, and the external resin layer B is a portion provided as the outermost layer of the battery case 120. The internal and external resin layers A' and A are provided to prevent a short circuit, etc., and may be formed using a polymer resin, etc., which is an electrical nonconductor. On the other hand, the metal layer B is interposed between the internal and external resin layers A' and A, so as to provide a predetermined mechanical strength to the battery case 120. For example, the metal layer B may include aluminum, etc.

When being extracted to the outside of the battery case 120, the first and second electrode tabs 111 and 112 are formed of a different material from the internal resin layer A', and therefore may interfere with the thermal fusion of the sealing portion 123 due to the structural characteristic of the first and second electrode tabs 111 and 112. Therefore, the first and second electrode tabs 111 and 112 are provided with first and second films 130a and 130b, respectively, and the first and second films 130a and 130b may be provided to be mounted on the sealing portion 123. The first and second films 130a and 130b facilitate the thermal fusion of the sealing portion 123, so that it is possible to inhibit the sealing performance of battery case 120 from being deteriorated.

For example, the first electrode tab 111 may include aluminum and the second electrode tab 112 may include nickel. While the first electrode tab 111 may have the same polarity as the metal layer B of the battery case 120, the second electrode tab 112 may have the opposite polarity to the metal layer B of the battery case 120. Therefore, an electrical short circuit may occur due to the contact between the second electrode tab 112 and the battery case 120, particularly, the metal layer B exposed at the end 124 of the sealing portion 123.

To prevent such a problem, the first and second films 130a and 130b may be provided to the first and second electrode tabs 111 and 112, respectively. In this case, the width t1 of each of the first and second films 130a and 130b in the extraction direction of the first and second electrode tabs 111 and 112 may be provided wider than the width S of the sealing portion 123 so that the first and second films 130a and 130b are extended to the outside of the sealing portion 123. That is, the width t1 of each of the first and second films 130a and 130b may be further extended than the width t2 corresponding to the width S of the sealing portion 123. Therefore, when the first and second electrode tabs 111 and 112 are extracted to the outside of the battery case 120 through the sealing portion 123 and then bent at the end 124 of the sealing portion 123, the width t1 of each of the first and second films 130a and 130b is provided to exceed the width t2 corresponding to the width S of the sealing portion 123, and thus it is possible to prevent or inhibit the first and second electrode tabs 111 and 112 from coming in direct contact with the end 124 of the sealing portion 123. Accordingly, it is possible to prevent or inhibit an electrical short circuit between the metal layer B of the battery case 120 and the first and second electrode tabs 111 and 112, thereby improving the stability of the battery pack.

The protective circuit module 10 is composed of a first surface 11 on which components 11a are mounted and a second surface 12 that is a surface opposite to the first surface 11. The first and second electrode tabs 111 and 112 are provided on the second surface 12, and the first surface 11 may face the accommodating portion 121a of the first sub-case 121. The protective circuit module 10 is provided to control current or resistance of the battery pack 100 and to stably use the battery pack 100. The components 11a may include a safety device, etc. At least one electrode-tab connecting portion 12a may be provided on the second surface 12 of the protective circuit module 10. The electrode-tab connecting portion 12a may be connected to the first and second electrode tabs 111 and 112. For example, the electrode-tab connecting portion 12a may be provided at a position corresponding to each of the first and second electrode tabs 111 and 112, so as to be connected to each of the first and second electrode tabs 111 and 112 through laser welding, soldering, etc.

Generally, a battery pack is necessarily provided with a protective circuit module, and the protective circuit module is connected to first and second electrode tabs of a bare cell. In this case, the connection between the protective circuit module and the first and second electrode tabs is performed by initially bending portions of the first and second electrode tabs at ends of first and second films respectively provided to the first and second electrode tabs, allowing the first and second electrode tabs to be spaced apart from the protective circuit module by the thickness of the protective circuit module at the bent portions of the first and second electrode tabs, then bending the first and second electrode tabs, and then connecting the ends of the first and second electrode tabs to the protective circuit module through welding. As a result, the protective circuit module is provided in a space between a battery case and the first and second electrode tabs. Since the protective circuit module is mounted on the first and second films respectively provided to the first and second electrode tabs, the thickness of the battery pack is increased by the thickness obtained by adding the thickness of each electrode tab to two times of the thickness of the electrode tab. Since the first and second electrode tabs are necessarily bent adjacent to the battery case even in the process of bending the first and second electrode tabs, it is difficult to perform the bending process due to the structural weakness of the first and second electrode tabs, and therefore, a short circuit, etc. may frequently occur, which results in a failure of the battery pack.

This embodiment provides a battery pack which solves a problem that occurs in the connection between the first and second electrode tabs and has an optimal flow path along which current flows from the first and second electrode tabs to the protective circuit module. In the battery pack, the first and second electrode tabs are connected to the protective circuit module using a new method, so that it is possible to reduce the volume of the battery pack. Further, it is possible to prevent or inhibit a failure in the process of manufacturing the battery pack, thereby improving process efficiency.

As shown in FIG. 1, in the battery pack 100 according to this embodiment, the first and second electrode tabs 111 and 112 are vertically bent from the end 124 of the sealing portion 123 so as to face the battery case 120, and the space between the battery case 120 and the first and second electrode tabs 111 and 112 may be provide to correspond to the protective circuit module 10. For example, the first and second films 130a and 130b are provided to the first and second electrode tabs 111 and 112, respectively. In this case, the first and second films 130a and 130b may be provided at the bent portions of the first and second electrode tabs 111 and 112, respectively.

A bending portion 131 is provided to at least one of the first and second films 130a and 130b. The bending portion 131 may be provided corresponding to the bent portion of each of the first and second electrode tabs 111 and 112. Thus, the bending portion 131 of each of the first and second films 130a and 130b comes in contact with the end 124 of the sealing portion 123 of the battery case 120, so as to guide each of the first and second electrodes 111 and 112 to be bent at a normal position.

The first and second electrode tabs 111 and 112 may be vertically bent, and one ends 111a and 112a of the first and second electrode tabs 111 and 112 may be electrically connected to the protective circuit module 10. For example, end portions of the first and second electrode tabs 111 and 112 may be bent in a Z-shape so as to facilitate the connection of the first and second electrode tabs 111 and 112 to the protective circuit module 10. Specifically, the one ends 111a and 112a of the first and second electrode tabs 111 and 112 may be connected to the protective circuit module 10 and then bent in the Z-shape so that the end portions of each of the first and second electrode tabs 111 and 112 overlap with each other. On the other hand, the end portions of the first and second electrode tabs 111 and 112 may be variously modified for convenience of connection between the protective circuit module 10 and the first and second electrode tabs 111 and 112.

After being bent, the first and second electrode tabs 111 and 112 face the battery case 120 while being spaced from the battery case 120, and the protective circuit module 10 is provided in the space between the battery case 120 and the first and second electrode tabs 111 and 112. The first surface 11 of the protective circuit module 10 faces the battery case 120, and the second surface 12 of the protective circuit module 10 is provided adjacent to the first and second electrode tabs 111 and 112. The one ends 111a and 112a of the first and second electrode tabs 111 and 112 may be electrically connected to the electrode-tab connecting portion 12a provided on the second surface 12 of the protective circuit module 10. In the battery pack 100 according to this embodiment, the protective circuit module 10 may be provided in a dead space provided according to the structural shape of the bare cell 150 so as to be connected to the bare cell 150. Thus, the length direction of the battery pack 100 is provided identically to that of the battery case 120, as well as the thickness of the battery pack 100, so that it is possible to optimize the volume of the battery pack 100 according to the capacity of the battery pack 100.

Hereinafter, other embodiments of the present invention will be described with reference to FIGS. 4 and 5. Contents of these embodiments, except the following contents, are similar to those of the embodiment described with reference to FIGS. 1 to 3, and therefore, their detailed descriptions will be omitted.

Figure 4:
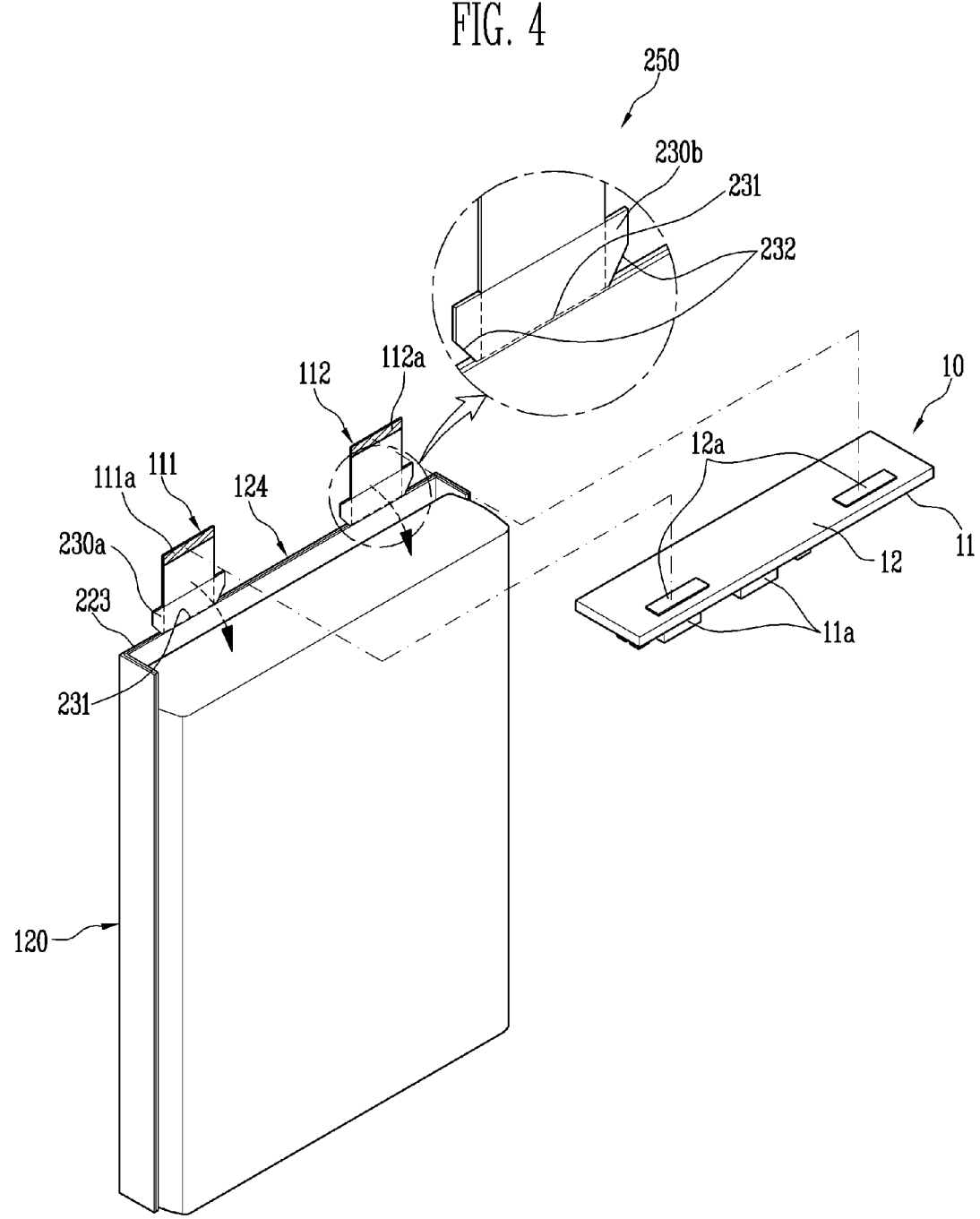
FIG. 4 is an exploded perspective view of a battery pack according to another embodiment of the present invention.

FIG. 4 is an exploded perspective view of a battery pack according to another embodiment of the present invention.

Referring to FIG. 4, the battery pack 200 according to this embodiment may include the battery case 120 having an electrode assembly built therein and the protective circuit module 10. The protective circuit module 10 may be electrically connected to the first and second electrode tabs 111 and 112. In this case, first and second films 230a and 230b may be provided to the first and second electrode tabs 111 and 112, respectively. A bending portion 231 is provided to each of the first and second films 230a and 230b. The bending portion 231 may be provided to a portion at which each of the first and second electrode tabs 111 and 112 is bent.

The first and second electrode tabs 111 and 112 are extracted to the outside of the battery case 120 through the sealing portion of the battery case 120. In this case, the first and second electrode tabs 111 and 112 are bent at the end 124 of the sealing portion 123. The first and second films 230a and 230b are bent together with the first and second electrode tabs 111 and 112 at the bending portions 231, respectively. In this case, the bending portion 231 may come in contact with the end 124 of the sealing portion 123. Each of the first and second films 230a and 230b may include a cut-away portion 232, and the cut-away portion 232 may be provided to the bending portion 231. The cut-away portion 232 facilitates the bending of the first and second electrode tabs 111 and 112, thereby improving process efficiency.

The first and second films 230a and 230b may be provided wider than the first and second electrode tabs 111 and 112, respectively, and the cut-away portion 232 may be provided so that the first and second electrode tabs 111 and 112 are not exposed. Thus, the cut-away portion 232 is provided to each of the first and second films 230a and 230b so that the first and second electrode tabs 111 and 112 are not exposed. Accordingly, it is possible to prevent or inhibit an electrical short circuit of the battery case 120 with the metal layer exposed at the end 124 of the sealing portion 123.

Figure 5:
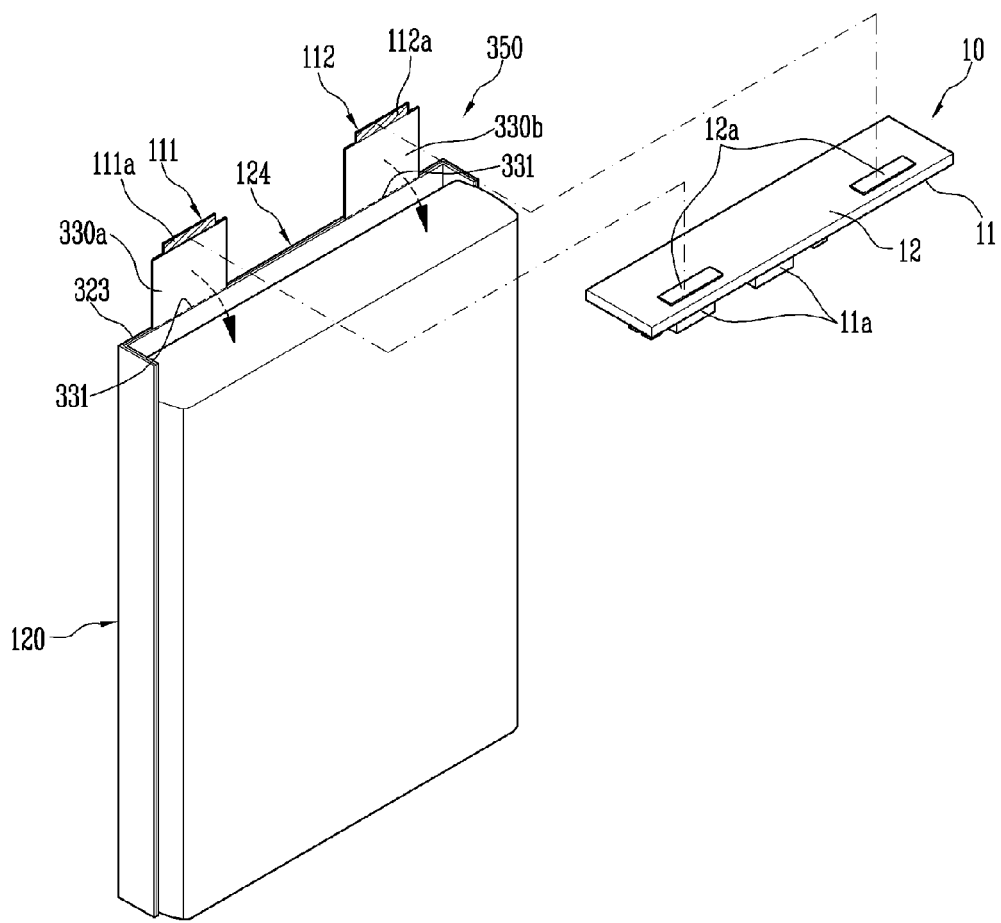
FIG. 5 is an exploded perspective view of a battery pack according to still another embodiment of the present invention.

FIG. 5 is an exploded perspective view of a battery pack according to still another embodiment of the present invention.

Referring to FIG. 5, the battery pack 300 according to this embodiment may include a bare cell 350 and the protective circuit module 10. The bare cell 350 and the protective circuit module 10 may be connected to each other by the first and second electrode tabs 111 and 112 extracted to the outside of the battery case 120 through the sealing portion 123 of the battery case 120. First and second films 330a and 330b having bending portions 331 may be provided to the first and second electrode tabs 111 and 112, respectively. The first and second electrode tabs 111 and 112 may be bent together with the first and second films 330a and 330b at the bending portions 331, respectively. The one ends 111a and 112a of the first and second electrode tabs 111 and 112 are connected to the protective circuit module 10. In this case, the first and second films 330a and 330b may be provided at portions except the one ends 111a and 112a of the first and second electrode tabs 111 and 112, respectively.

In the battery pack 300 according to this embodiment, the first and second films 330a and 330b may be provided except the portions of the first and second electrode tabs 111 and 112, which are connected to the protective circuit module 10. The first and second films 330a and 330b are provided in wide regions of the first and second electrode tabs 111 and 112, respectively, so that the portions that insulate the respective first and second electrode tabs 111 and 112 from the battery case 120 are increased, thereby improving electrical stability of the battery pack. Further, the first and second films 330a and 330b support the first and second electrode tabs 111 and 112, respectively, so that it is possible to facilitate the bending of the first and second electrode tabs 111 and 112.

For example, the one ends 111a and 112a of the first and second electrode tabs 111 and 112 may be connected to the protective circuit module 10 through laser welding, soldering, etc. In a case where the first and second films 330a and 330b are provided to the portions at which the first and second electrode tabs 111 and 112 are connected to the protective circuit module 10, the first and second films 330a and 330b may interfere with the laser welding, soldering, etc. Therefore, the first and second films 330a and 330b are provided to cover the first and second electrode tabs 111 and 112 exposed through the sealing portion 123 of the battery case 120 as wide as possible. Preferably, the first and second films 330a and 330b are provided in regions except the one ends 111a and 112a of the first and second electrode tabs 111 and 112 that are portions at which the first and second electrode tabs 111 and 112 are connected to the protective circuit module 10.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery pack, comprising:
   an electrode assembly composed of first and second electrode plates, a separator interposed between the first and second electrode plates, and first and second electrode tabs respectively connected to the first and second electrode plates;
   a protective circuit module having a first and a second surface that is connected to the first and second electrode tabs; and
   a battery case that has a main body that accommodates the electrode assembly and has a sealing portion provided at an edge of the main body that extends in a first direction wherein the main body case defines an end wall that is adjacent the sealing portion and extends in a second direction that intersects the first direction and wherein the protective circuit module is mounted on the end wall of the main body so that the first surface of the protective circuit module is positioned adjacent the end wall of the main body,
   wherein the first and second electrode tabs are extracted to the outside of the battery case through the sealing portion in the first direction and then bent at an end of the sealing portion so as to extend over the end wall of the main body of the battery case and connect to the protective circuit module on the second surface of the protective circuit module, so that the protective circuit module is provided between the end wall of the battery case and the first and second electrode tabs at their connection point to the protective circuit module.

2. The battery pack according to claim 1, wherein the battery case is composed of first and second sub-cases, an accommodating portion that accommodates the electrode assembly is provided to the first sub-case, and the second sub-case covers the first sub-case.

3. The battery pack according to claim 2, wherein the first and second electrode tabs are extracted to the outside of the battery case through the sealing portion and then bent at the end of the sealing portion so as to face the accommodating portion of the first sub-case.

4. The battery pack according to claim 3, wherein the protective circuit module is composed of a first surface on which components are mounted and a second surface that is a surface opposite to the first surface, the first and second electrode tabs are provided on the second surface, and the first surface faces the accommodating portion of the first sub-case.

5. The battery pack according to claim 1, wherein the first and second electrode tabs are provided with first and second films, respectively, and the first and second films are provided to be mounted on the sealing portion.

6. The battery pack according to claim 5, wherein the width of each of the first and second films in the extraction direction of the first and second electrode tabs is provided wider than that of the sealing portion so that the first and second films are extended to the outside of the sealing portion.

7. The battery pack according to claim 6, wherein at least one of the first and second films is provided with a bending portion, and the bending portion is provided to correspond to the portion at which each of the first and second electrode tabs is bent.

8. The battery pack according to claim 7, wherein each of the first and second films is further provided with a cut-away portion, and the cut-away portion is provided to correspond to the bending portion.

9. The battery pack according to claim 8, wherein the first and second films are provided wider than the first and second electrode tabs, respectively, and the cut-away portion is provided so that the first and second electrode tabs are not exposed.

10. The battery pack according to claim 5, wherein one ends of the first and second electrode tabs are connected to the protective circuit module, and the first and second films are provided at portions except the one ends of the first and second electrode tabs, respectively.

11. The battery pack according to claim 1, wherein the first and second electrode tabs are vertically bent at the end of the sealing portion of the battery case, and the space between the battery case and the first and second electrodes is provided to correspond to the protective circuit module.

12. The battery pack according to claim 1, wherein the first and second electrode plates include positive and negative electrode plates, respectively, the first and second electrode tabs include positive and negative electrode tabs, respectively, the battery case is sequentially composed of an internal resin layer, a metal layer and an external resin layer, and the metal layer is made of the same metal as the first electrode tab.

13. A battery pack comprising:
a battery case having a sealing portion and a main body having a first surface the main body containing an electrode assembly having a first and a second electrode tabs that extend outward of the case through the sealing portion in a first direction adjacent the first surface of the battery case wherein the first surface of the main body extends in a second direction that intersects the first direction;
a protective circuit module positioned adjacent the first surface of the case, wherein the protective circuit module includes a first and a second surface with the first surface of the protective circuit module being positioned proximate the first surface of the main body of the case so that the protective circuit module is interposed between the first surface of the case and the second surface of the protective circuit module; and
wherein the first and second electrode tabs are respectively bent to extend over the first surface of the battery case at a bending portion so as to contact the second surface of the protective circuit module so that the protective circuit module is provided between the first surface of the battery case and the first and second electrode tabs at their connection point to the protective circuit module.

14. The battery pack of claim 13, wherein the sealing portion is positioned proximate a first edge of the first surface of the battery case and wherein the first and second electrode tabs are bent so as to extend outward from the sealing portion and then over the first surface of the battery case.

15. The battery case of claim 13, wherein the first and second electrode tabs are provided with first and second films, respectively, and the first and second films are provided to be mounted adjacent the bending portions of the first and second electrode tabs where the first and second electrode is bent over the first surface of the battery case.

16. The battery case of claim 15, wherein the at least one of the first and second electrode tabs is further provided with a cut-away portion, and the cut-away portion is provided to correspond to the bending portion.

17. The battery case of claim 16, wherein the first and second films are provided wider than the first and second electrode tabs respectively and the cut-away portion is provided so that the first and second electrodes are not exposed.

18. The battery case of claim 13, wherein the first and second electrode plates include positive and negative electrode plates, respectively, the first and second electrode tabs including positive and negative electrode tabs, respectively, the battery case is sequentially composed of an internal resin layer, a metal layer and an external resin layer, and the metal layer is made of the same metal as the first electrode tab.

* * * * *